(12) United States Patent
Aoyama

(10) Patent No.: US 10,084,360 B2
(45) Date of Patent: Sep. 25, 2018

(54) ELECTRIC WORKING MACHINE

(71) Applicant: MAKITA CORPORATION, Anjo-shi, Aichi-ken (JP)

(72) Inventor: Kiyoshi Aoyama, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 378 days.

(21) Appl. No.: 14/918,026

(22) Filed: Oct. 20, 2015

(65) Prior Publication Data

US 2016/0141939 A1 May 19, 2016

(30) Foreign Application Priority Data

Nov. 14, 2014 (JP) .................... 2014-231481

(51) Int. Cl.
| | |
|---|---|
| *H02K 11/215* | (2016.01) |
| *H02K 11/00* | (2016.01) |
| *H02K 21/22* | (2006.01) |
| *H02K 5/22* | (2006.01) |
| *H02K 7/14* | (2006.01) |

(52) U.S. Cl.
CPC ......... *H02K 11/0021* (2013.01); *H02K 5/225* (2013.01); *H02K 7/145* (2013.01); *H02K 11/215* (2016.01); *H02K 21/22* (2013.01)

(58) Field of Classification Search
CPC .................................................. H02K 11/215
See application file for complete search history.

(56) References Cited

U.S. PATENT DOCUMENTS

| 7,310,966 B2 * | 12/2007 | Wagner .............. B60H 1/00407 62/298 |
|---|---|---|
| 2002/0079755 A1 * | 6/2002 | Sunaga .................. H02K 11/33 310/67 R |
| 2007/0046122 A1 | 3/2007 | Makiuchi et al. |
| 2007/0252454 A1 | 11/2007 | Hayashi et al. |
| 2008/0211356 A1 | 9/2008 | Kataoka et al. |
| 2010/0225206 A1 | 9/2010 | Zhang |

FOREIGN PATENT DOCUMENTS

| JP | 2005-333741 A | 12/2005 |
|---|---|---|
| JP | 2006-150571 A | 6/2006 |
| JP | 2007-060844 A | 3/2007 |
| JP | 2008-219995 A | 9/2008 |
| JP | 2013-027252 A | 2/2013 |
| JP | 2013-110962 A | 6/2013 |

OTHER PUBLICATIONS

Nov. 14, 2017 Office Action issued in Japanese Patent Application No. 2014-231481.
May 15, 2018 Office Action issued in Japanese Patent Appliction No. 2014-231481.

* cited by examiner

*Primary Examiner* — Ramon M Barrera
(74) *Attorney, Agent, or Firm* — Oliff PLC

(57) ABSTRACT

The present application discloses an electric working machine. The electric working machine includes: a motor including a rotor; a sensor board including a magnetic sensor for detecting magnetic variation due to rotation of the rotor; and a housing which contains the motor and the sensor board. in the electric working machine, the sensor board does not cover an entire circumference of the rotor. In the electric working machine, the sensor board has a portion covering the rotor, and a portion not covering the rotor.

7 Claims, 18 Drawing Sheets

ELECTRIC WORKING MACHINE

CROSS-REFERENCE TO RELATED APPLICATION(S)

This application claims priority to Japanese Patent Application No. 2014-231481 filed on Nov. 14, 2014, the contents of which are hereby incorporated by reference into the present application.

TECHNICAL FIELD

The present application relates to an electric working machine.

DESCRIPTION OF RELATED ART

JP 2006-150571 A discloses an electric working machine. The electric working machine includes: a motor including a rotor; a sensor board including a magnetic sensor for detecting magnetic variation due to rotation of the rotor; and a housing that contains the motor and the sensor board.

BRIEF SUMMARY OF INVENTION

In the conventional technique, the sensor board is formed in such a doughnut shape as to cover the entire circumference of the rotor. However, in the case of manufacturing the sensor boards in such a shape, the yield ratio is deteriorated. The present application provides, regarding an electric working machine including a motor and a sensor board, a technique of allowing for improvement in the yield ratio of the sensor board.

The present application discloses an electric working machine. The electric working machine includes: a motor including a rotor; a sensor board including a magnetic sensor configured to detect magnetic variation due to rotation of the rotor; and a housing which contains the motor and the sensor board. In the electric working machine, the sensor board does not cover an entire circumference of the rotor. In the electric working machine, the sensor board has a portion covering the rotor, and a portion not covering the rotor.

In the above electric working machine, the sensor board does not cover the entire circumference of the rotor, and the sensor board has the portion covering the rotor, and the portion not covering the rotor. Therefore, it is not necessary to form the sensor board in a doughnut shape as in a conventional technique, and the sensor board can be manufactured with such a shape as to improve the yield ratio. Thus, the yield ratio of the sensor board can be improved.

DETAILED DESCRIPTION OF INVENTION

Figure 1:
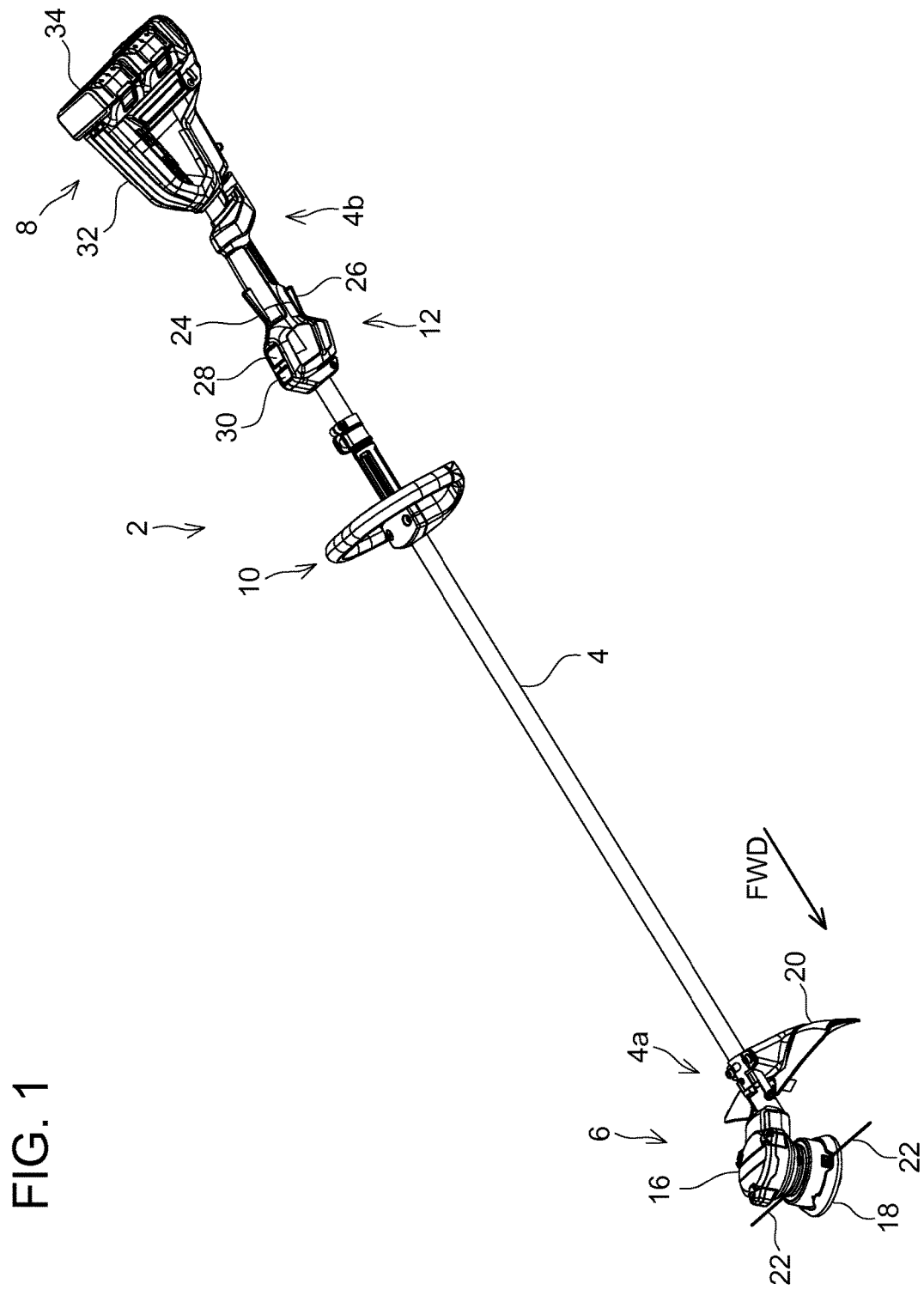
FIG. 1 is a perspective view showing a bush cutter 2 in an embodiment.

In some embodiments, of the sensor board, the portion not covering the rotor is broader than the portion covering the rotor. In this case, increase in the temperature of the sensor board due to heat generated by the motor can be suppressed.

In some embodiments, the sensor board is fixed to the housing while the portion not covering the rotor is in contact with a seat surface. In this case, the sensor board can be securely fixed. Error in detection of the rotational position of the rotor due to vibration of the sensor board can be suppressed.

In some embodiments, the seat surface is formed as a member made of resin, and the sensor board is fixed to the housing via the member made of resin. In this case, since the member made of resin is interposed between the housing and the sensor board, even if the temperature of the housing increases due to heat generated by the motor, increase in the temperature of the sensor board can be suppressed. In addition, the sensor board and the housing can be electrically insulated from each other.

In some embodiments, the sensor board is fixed to the housing by a fastening element. In this case, the sensor board can be securely fixed to the housing. Error in detection of the rotational position of the rotor due to vibration of the sensor board can be suppressed.

In some embodiments, the sensor board has a cutout at a side end of the portion covering the rotor. In this case, the sensor board can be prevented from interfering with the coil wound on the stator.

In some embodiments, the sensor board covers a range narrower than 180 degrees, of the rotor. In this case, complication in the shape of the sensor board can be suppressed, and the sensor board can be manufactured with such a shape as to improve the yield ratio. Thus, the yield ratio of the sensor board can be improved.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may he utilized separately or in conjunction with other features and teachings to provide improved electric working machines, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(Embodiments)

Hereinafter, a bush cutter 2 according to an embodiment of an electric working machine will be described with reference to the drawings. The bush cutter 2 shown in FIG. 1 is a horticultural electric working machine and is used for cutting a plant. The bush cutter 2 includes: a support pole 4; a front end unit 6 provided at a front end 4a of the support pole 4; a rear end unit 8 provided at a rear end 4b of the support pole 4; a loop handle 10 provided at a middle of the support pole 4; and a grip 12 provided between the loop handle 10 and the rear end unit 8 of the support pole 4. The support pole 4 has a hollow pipe shape and linearly extends from the front end 4a to the rear end 4b.

Figure 2:
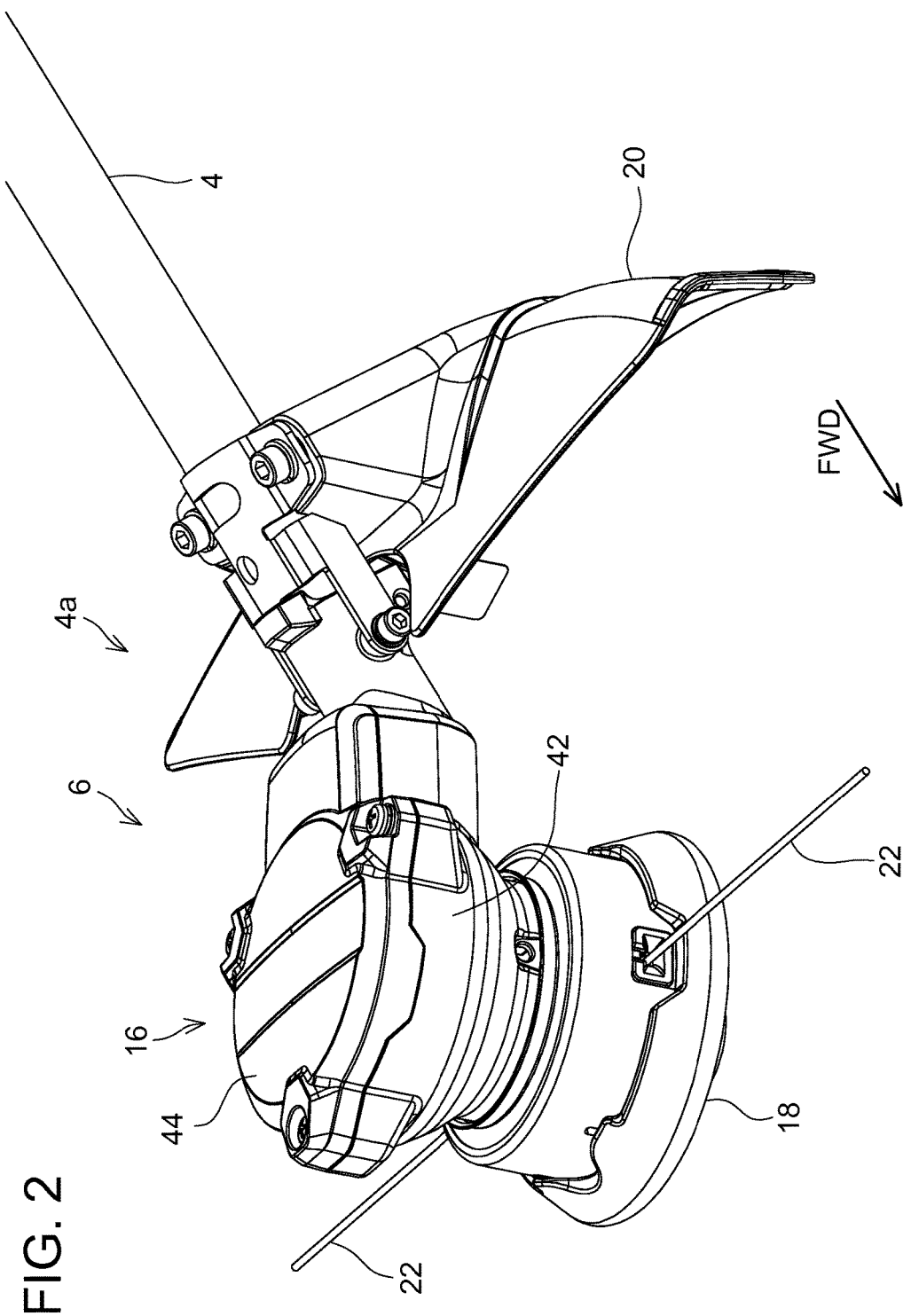
FIG. 2 is a perspective view showing a front end unit 6 of the bush cutter 2 in the embodiment.

As shown in FIG. 2, the front end unit 6 includes: a motor housing 16 which contains a motor 14 (see FIG. 3); a cord holder 18 detachably attached under the motor housing 16; and a safety cover 20 attached to the support pole 4, at a rear side relative to the motor housing 16 and the cord holder 18. The motor 14 is a brushless three-phase motor of outer rotor type. The cord holder 18 is rotationally driven by the motor 14. The cord holder 18 holds a string-like cutter cord 22. Ends of the cutter cord 22 are drawn out from the cord holder 18, and rotated with the cord holder 18. The bush cutter 2 of the present embodiment cuts a plant by the cutter cord rotating at a high speed. The cutter cord 22 in the present embodiment is, for example, a nylon cord.

The loop handle 10 shown in FIG. 1 has a hollow pipe shape, and is formed in a loop shape expanding upward and laterally with respect to the support pole 4. The loop handle 10 is fixed to the support pole 4.

The grip 12 is formed so as to cover the outer circumference of the support pole 4. The grip 12 has a lock-off lever 24 provided on an upper surface thereof, and a trigger switch 26 provided on a lower surface thereof The trigger switch 26 is a switch for driving the motor 14 of the front end unit 6. When the trigger switch 26 is not pushed, supply of power to the motor 14 is interrupted. When the trigger switch 26 is pushed, power is supplied to the motor 14. The lock-off lever 24 is a lever for restricting a pushing operation of the trigger switch 26 and cancelling the restriction. When the lock-off lever 24 is not pushed, a pushing operation of the trigger switch 26 is restricted. When the lock-off lever 24 is pushed, the restriction of a pushing operation of the trigger switch 26 is cancelled.

On an upper surface of the grip 12, an operation panel 28 and a display panel 30 are provided at a front side relative to the lock-off lever 24. The operation panel 28 contains an operation board (not shown). On the operation board, an operation button 28a (see FIG. 10) for controlling driving of the motor 14 of the front end unit 6 is provided. A worker can perform operation such as switching between driving and stop of the motor 14, switching the rotation direction of the motor 14, and changing the rotation speed of the motor 14, by operating the operation button 28a. The display panel 30 contains a display board (not shown). On the display board, a display lamp 30a (see FIG. 10) is attached which displays an operation state of the motor 14.

A worker who uses the bush cutter 2 grasps the loop handle 10 with one hand, and grasps the grip 12 with the other hand. Then, the worker performs a pushing operation of the lock-off lever 24 with the base of the thumb of the hand grasping the grip 12, and performs a pushing operation of the trigger switch 26 with the index finger, the middle finger, the ring finger, and/or the little finger of the same hand. Thus, power is supplied to the motor 14. In this state, the worker operates the operation button 28a of the operation panel 28 with the thumb of the hand grasping the grip 12, thereby controlling operation of the motor 14.

Figure 3:
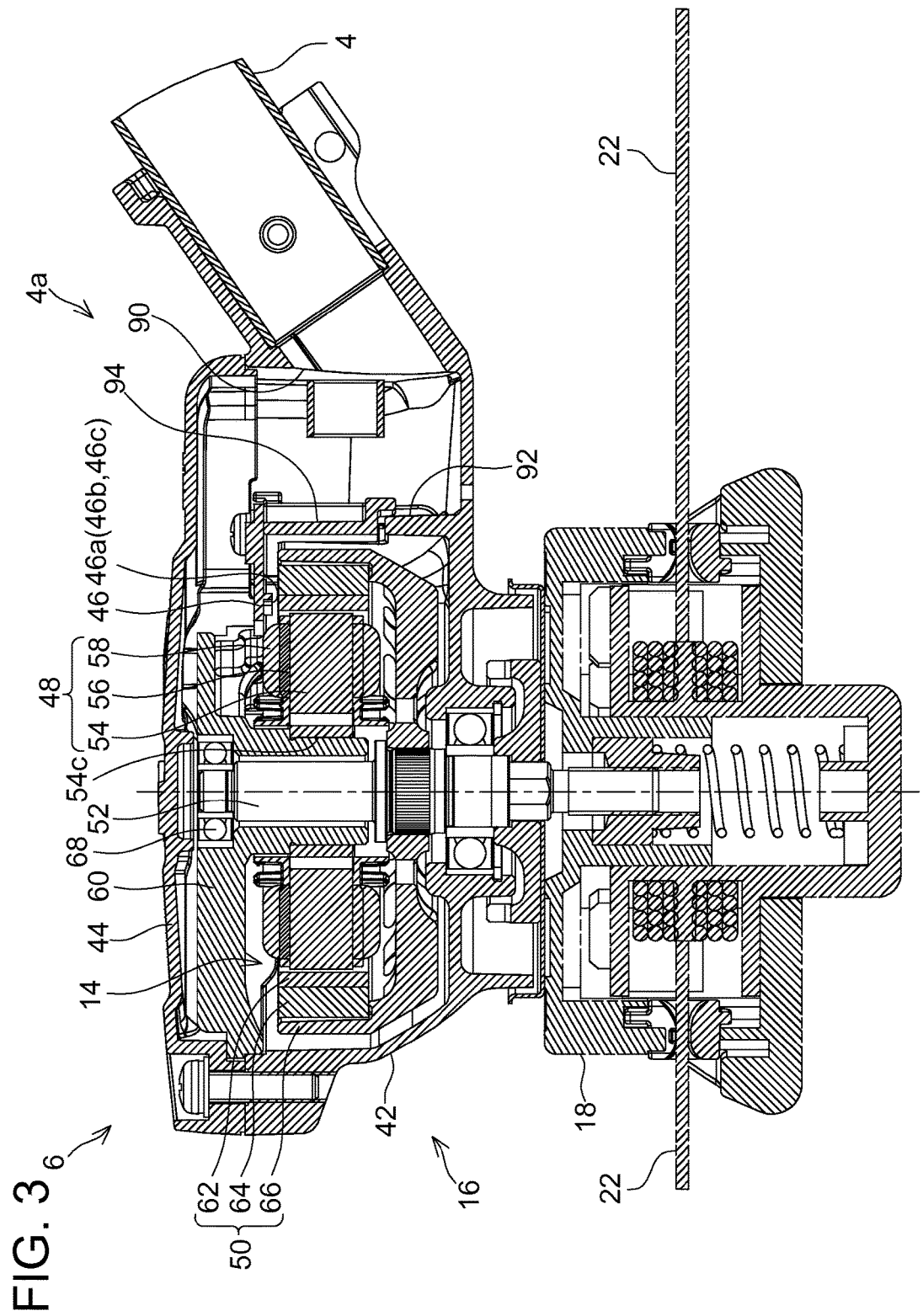
FIG. 3 is a vertical sectional view of the front end unit 6 of the bush cutter 2 in the embodiment.

As shown in FIG. 3, the motor housing 16 of the front end unit 6 includes a housing body 42 which opens at its upper part, and an upper surface cover 44 which covers the opening at the upper part of the housing body 42. The housing body 42 contains the motor 14 and the sensor board 46. The motor 14 includes a stator 48, a rotor 50, and a motor shaft 52.

Figure 4:
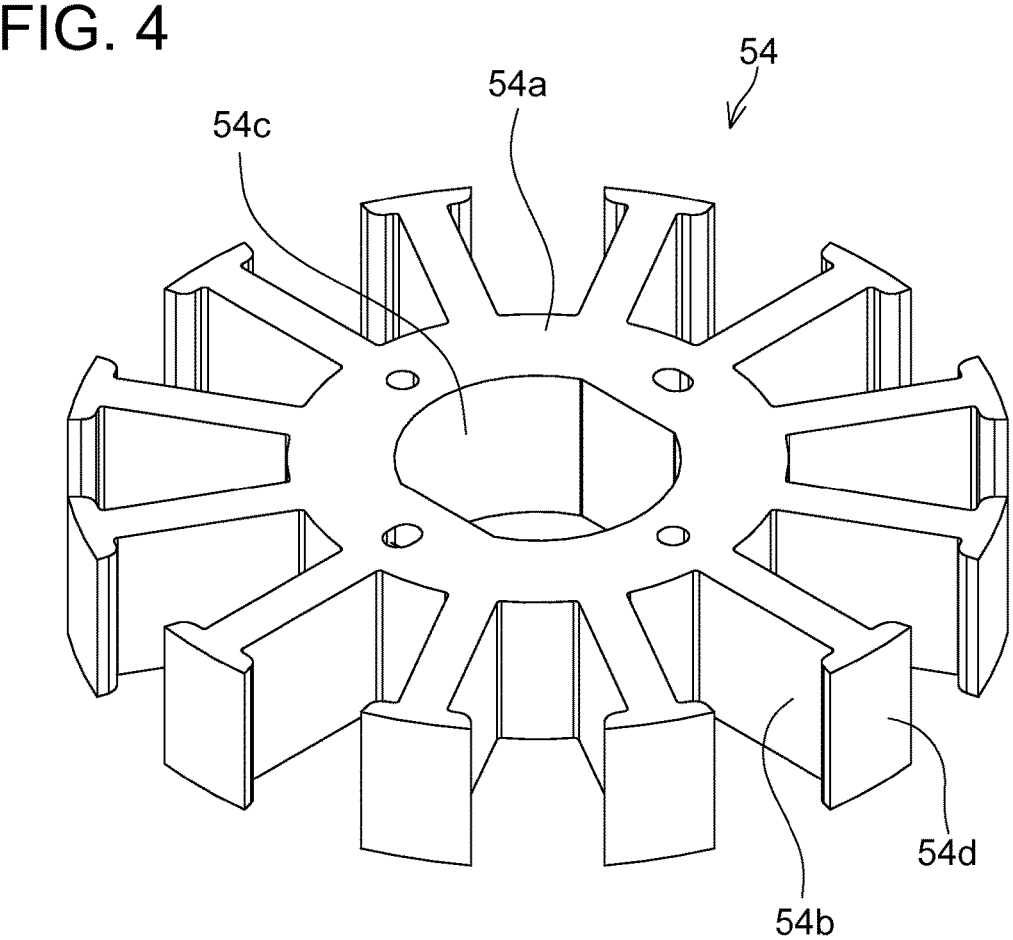
FIG. 4 is a perspective view showing a stator core 54 of the bush cutter 2 in the embodiment.

The stator 48 includes a stator core 54, an insulator 56, and a coil 58. The stator core 54 is made of magnetic material. As shown in FIG. 4, the stator core 54 has a cylindrical base portion 54a at the center thereof, and a plurality of tooth portions 54b radially extending along the radial direction from the cylindrical base portion 54a. In the present embodiment, the stator core 54 has twelve tooth portions 54b. At the center of the base portion 54a, a fitting hole 54c is formed into which a stator base 60 (see FIG. 3) is fitted. As shown in FIG. 3, the stator base 60 is fitted into the fitting hole 54c of the stator core 54, and the stator base 60 is fixed to the housing body 42, whereby the stator 48 is fixed to the housing body 42.

Figure 5:
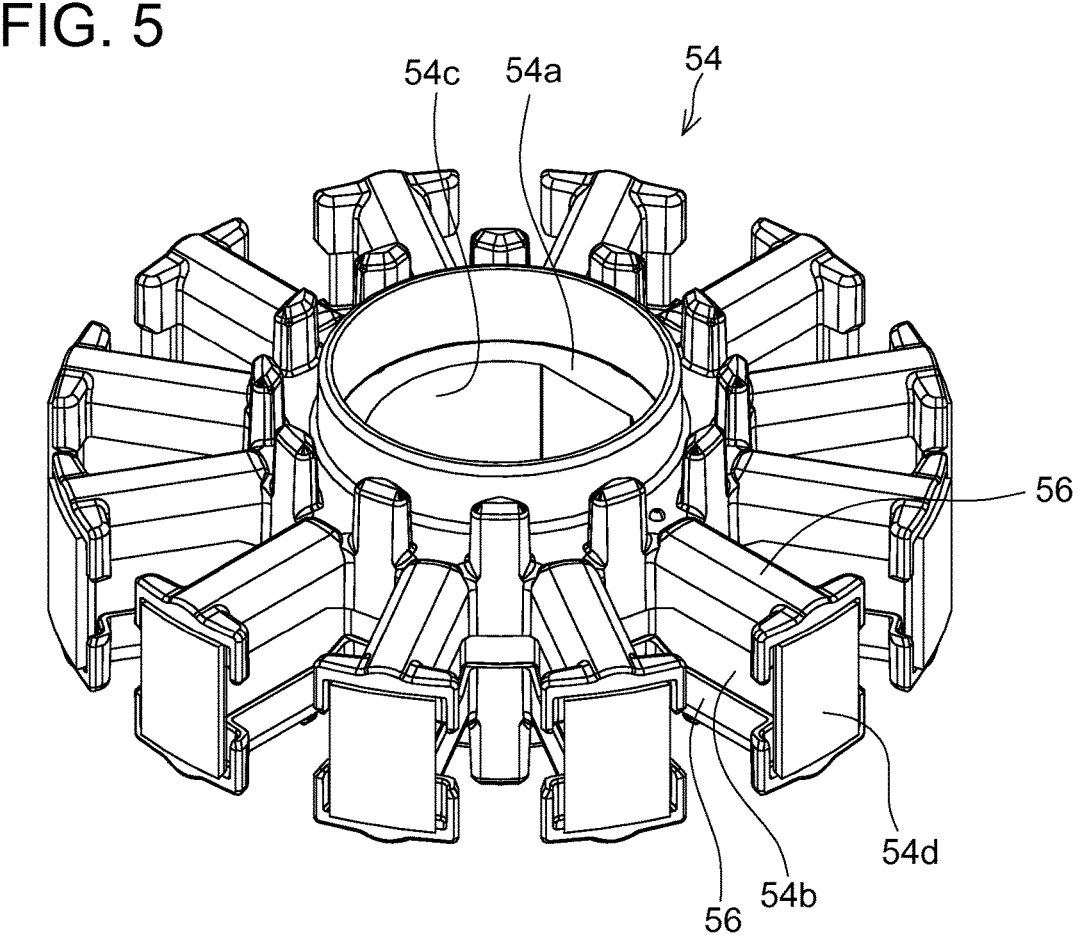
FIG. 5 is a perspective view showing the stator core 54 and an insulator 56 of the bush cutter 2 in the embodiment.

The insulator 56 is made of resin material, and electrically insulates the stator core 54 and the coil 58 from each other. As shown in FIG. 5, the insulator 56 is formed so as to cover an upper surface side and a lower surface side of the base portion 54a and the tooth portions 54b of the stator core 54. In a state in which the insulator 56 is attached, an end surface 54d of each tooth portion 54h is exposed.

Figure 6:
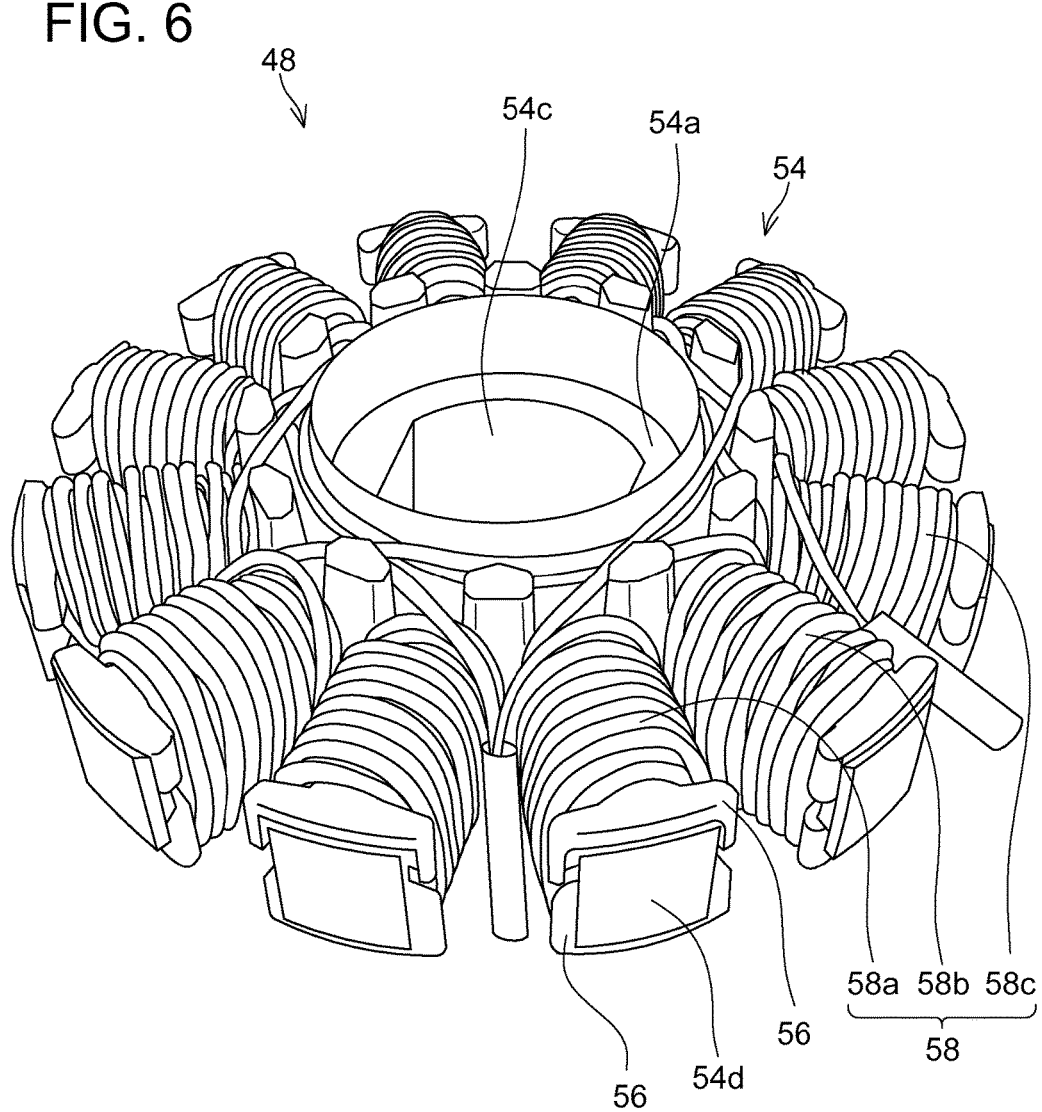
FIG. 6 is a perspective view showing a stator 48 of the hush cutter 2 in the embodiment.

As shown in FIG. 6, the coil 58 is wound around the circumferential side surface of each tooth portion 54b of the stator core 54 from outside of the insulator 56. The coil 58 includes a U-phase coil 58a, a V-phase coil 58b, and a NV-phase coil 58c, to which U-phase voltage, V-phase voltage, and W-phase voltage are applied, respectively. When current is applied to the coil 58, the tooth portions 54b of the stator core 54 are excited, and the end surfaces 54d of the tooth portions 54b operate as magnetic poles.

Figure 7:
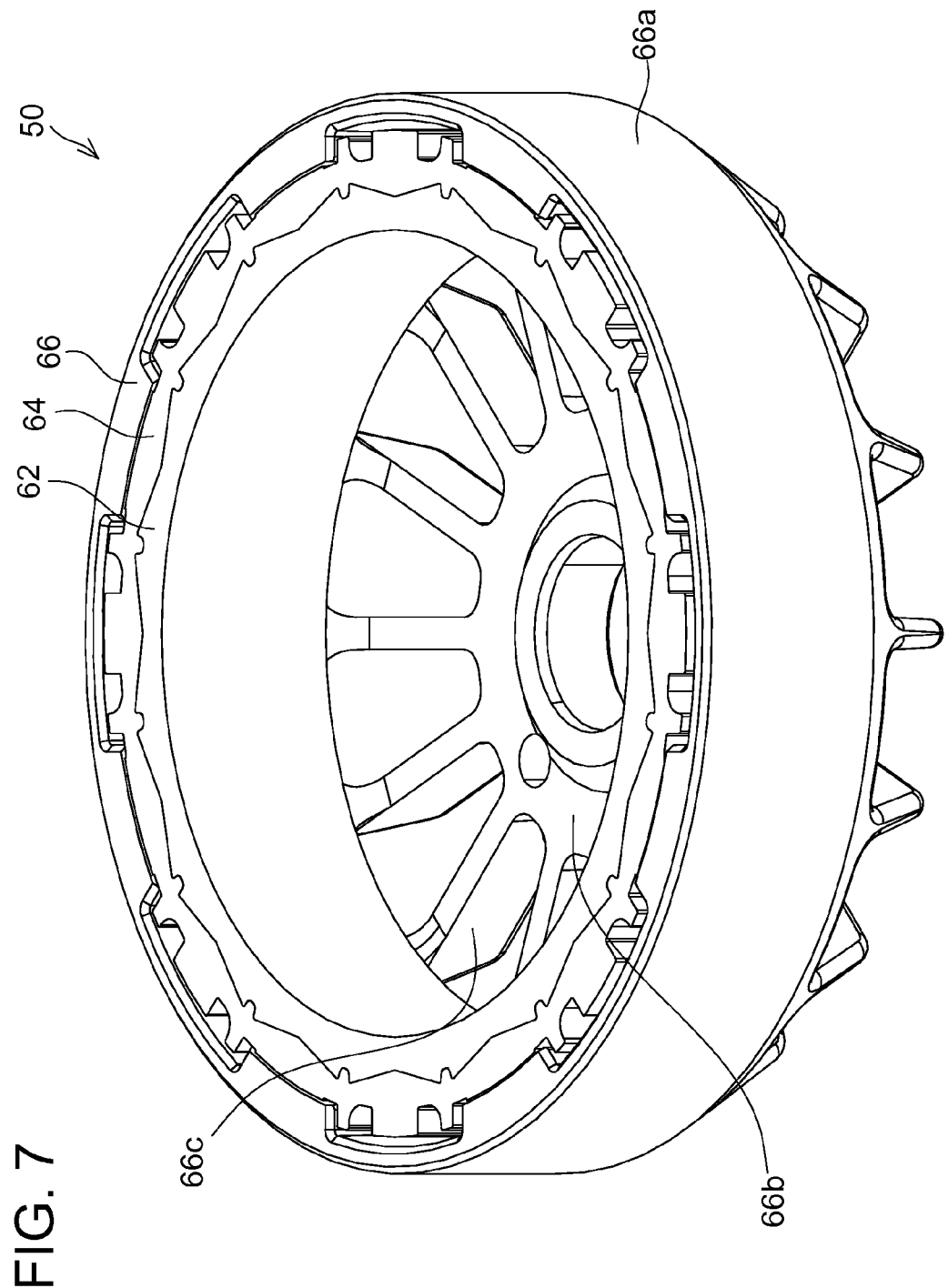
FIG. 7 is a perspective view showing a rotor 50 of the bush cutter 2 in the embodiment.

As shown in FIG. 7, the rotor 50 includes: a magnet 62 having an inner circumferential surface formed in a cylindrical shape; a rotor core 64 integrally attached on an outer circumferential surface of the magnet 62; and a fan 66 fixed to the rotor core 64. The magnet 62 is made of rare earth anisotropic bond magnet. The rotor core 64 is formed by stacking a plurality of electromagnetic steel sheets. The fan 66 is made of metal material.

Figure 8:
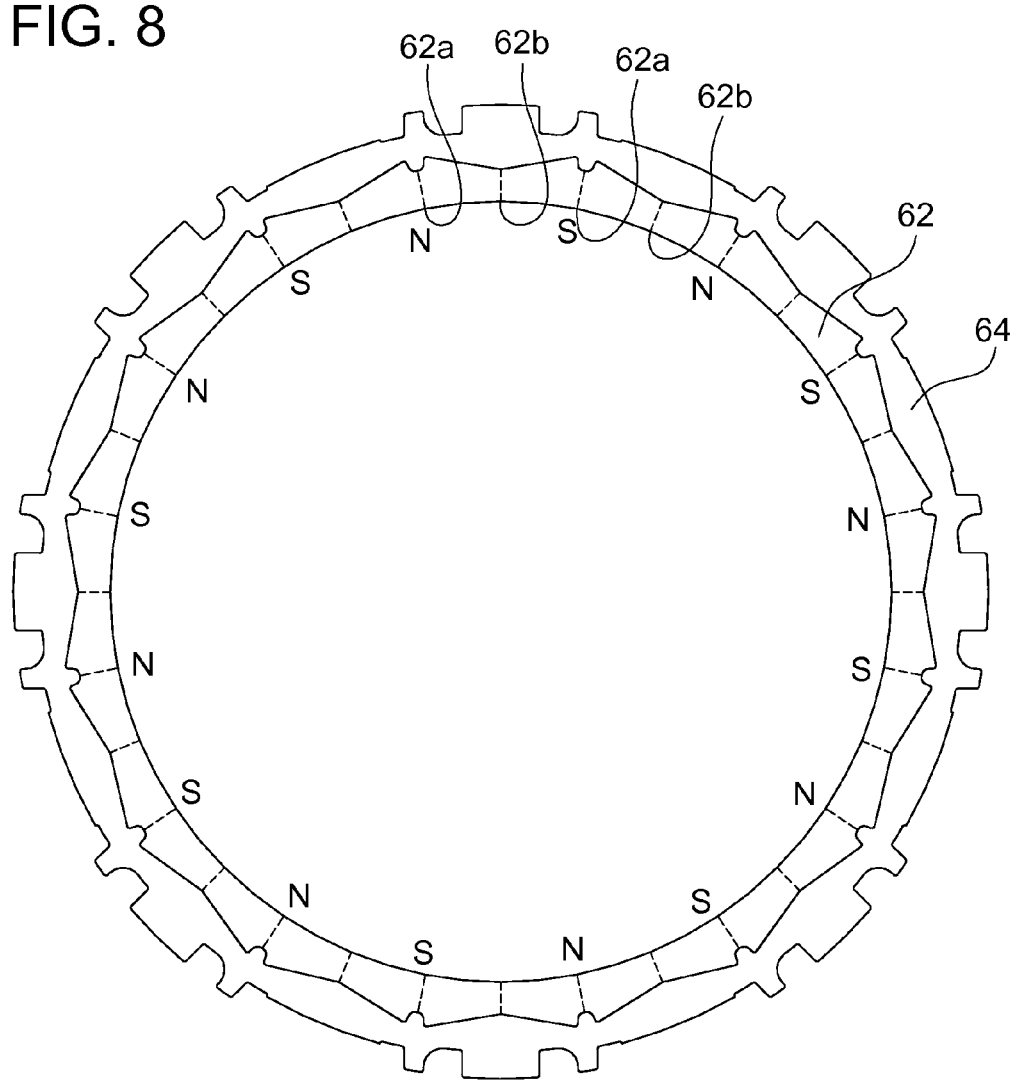
FIG. 8 is a plan view showing a magnet 62 and a rotor core 64 of the bush cutter 2 in the embodiment.

As shown in FIG. 8, the magnet 62 is magnetized such that two kinds of magnetic poles of N pole and S pole are alternately formed on the inner circumferential surface thereof. The magnet 62 is formed such that the width in the radial direction is great in the vicinity of a position 62a which is the center of each magnetic pole, and the width in the radial direction is small in the vicinity of a position 62b at which the magnetic pole is switched. In other words, in the vicinity of the position 62a at the center of each magnetic pole, the width in the radial direction of the magnet 62 is greater than the average width in the radial direction of the magnet 62, and in the vicinity of the position 62b at which the magnetic pole is switched, the width in the radial direction of the magnet 62 is smaller than the average width in the radial direction of the magnet 62.

Figure 9:
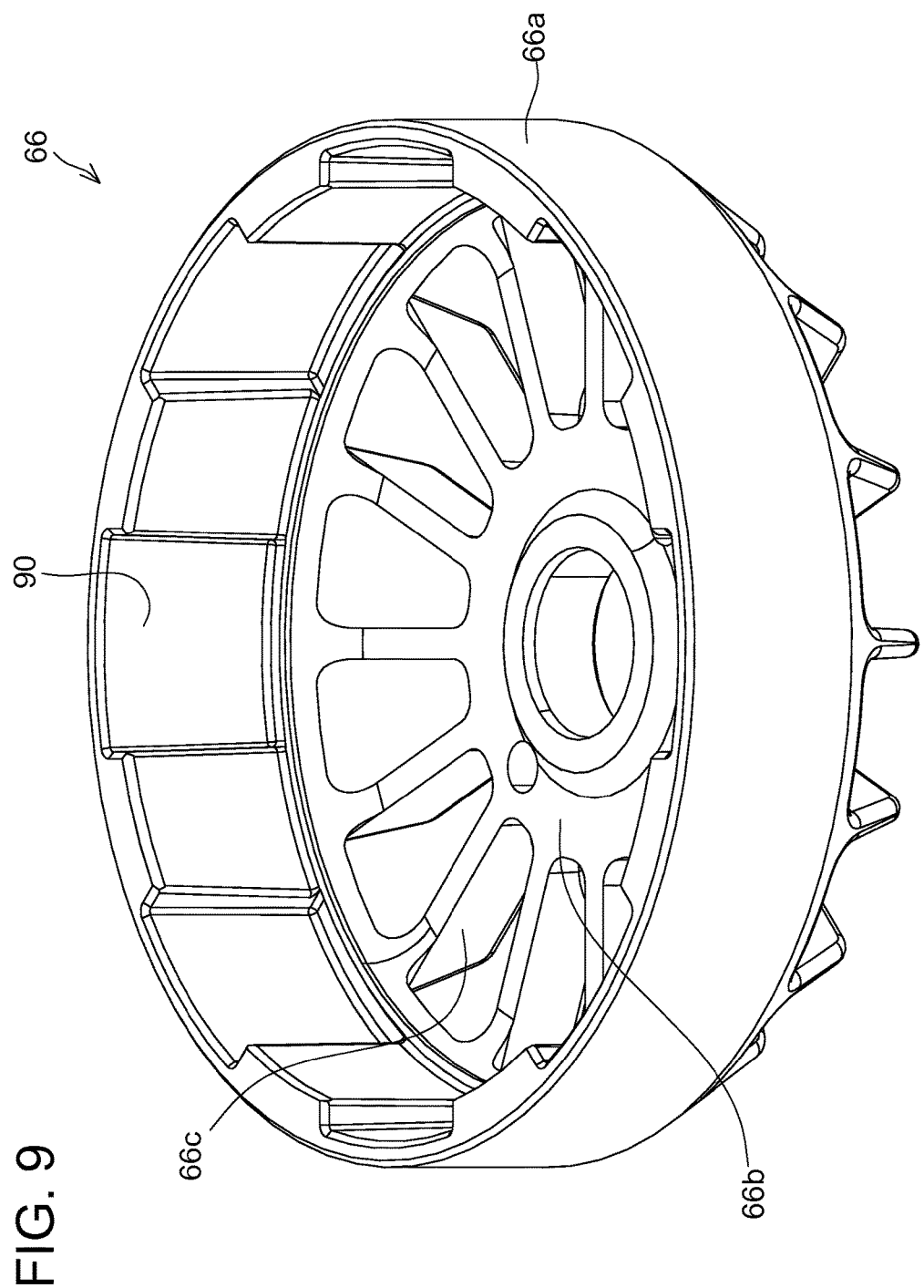
FIG. 9 is a perspective view showing a fan 66 of the bush cutter 2 in the embodiment.

As shown in FIG. 9, the fan 66 has: a cylindrical storage portion 66a which stores the magnet 62 and the rotor core 64; a connection portion 66b connected with the motor shaft 52; and a plurality of plate-like blade portions 66c radially extending between the storage portion 66a and the connection portion 66b. By driving of the motor 14, the fan 66 is rotated integrally with the magnet 62 and the rotor core 64, whereby air is sent to the stator 48 by the blade portions 66c.

As shown in FIG. 3, an upper end of the motor shaft 52 is supported by the stator base 60 via a bearing 68, and a lower end thereof is connected to the cord holder 18. Rotation of the motor 14 is transmitted to the cord holder 18 via the motor shaft 52.

On the sensor board 46, a plurality of magnetic sensors 46a, 46b, and 46c are attached for detecting variation in a magnetic field due to rotation of the rotor 50. The magnetic sensors 46a, 46b, and 46c in the present embodiment are, for example, Hall elements. The sensor board 46 is fixed, to the housing body 42, at such a position that the magnetic sensors 46a, 46b, and 46c are opposed to the magnet 62 of the rotor 50.

As shown in FIG. 1, the rear end unit 8 includes a rear end housing 32 containing a control board (not shown), and a battery pack 34 detachably attached to the rear end housing 32. The battery pack 34 has a plurality of rechargeable battery cells. The battery pack 34 has, for example, ten lithium ion battery cells connected in series, and has a nominal voltage of 36 volts.

Figure 10:
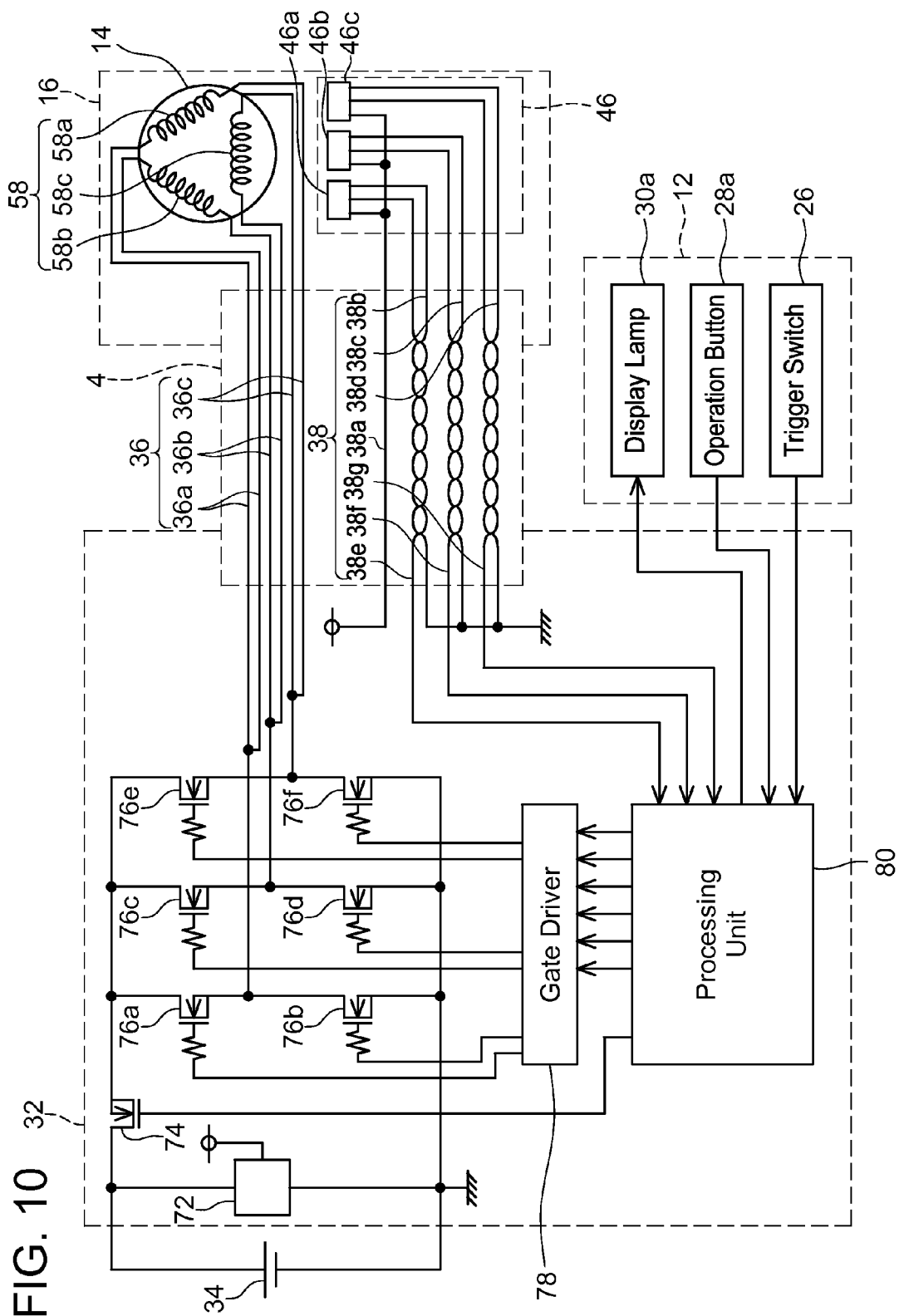
FIG. 10 is a circuit diagram showing an electrical system of the bush cutter 2 in the embodiment.

As shown in FIG. 10, the control board includes a constant voltage circuit 72, interruption circuit 74, switching elements 76a, 76b, 76c, 76d, 76e, and 76f, a gate driver 78, and a processing unit 80. The constant voltage circuit 72 is electrically connected to the battery pack 34. The constant voltage circuit 72 generates power supply voltage for the control board. The interruption circuit 74 is provided on a circuit electrically connecting the battery pack 34 and the switching elements 76a, 76b, 76c, 76d, 76e, and 76f, and is capable of switching a conductive state/nonconductive state between the battery pack 34 and the switching elements 76a, 76b, 76c, 76d, 76e, and 76f. The interruption circuit 74 in the present embodiment is, for example, a metal oxide semiconductor field effect transistor (MOSFET). The interruption circuit 74 may be an insulated gate bipolar transistor (IGBT) or another switching element. The interruption circuit 74 is connected to the processing unit 80, and controlled to be switched between a conductive state and a nonconductive state by the processing unit 80.

The switching elements 76a, 76b, 76c, 76d, 76e, and 76f in the present embodiment are, for example, metal oxide semiconductor field effect transistors (MOSFET). The switching elements 76a, 76b, 76c, 76d, 76e, and 76f may be insulated gate bipolar transistors (IGBT) or other switching elements. The switching elements 76a, 76b, 76c, 76d, 76e, and 76f are connected to the coil 58 of the motor 14 via a motor power line 36. The motor power line 36 includes a UV line 36a, a VW line 36b, and a WU line 36c. The UV line 36a is connected to a start end of the U-phase coil 58a and a finish end of the V-phase coil 58b. The VW line 36b is connected to a start end of the V-phase coil 58b and a finish end of the W-phase coil 58c. The WU line 36c is connected to a start end of the W-phase coil 58c and a finish end of the U-phase coil 58a. The switching elements 76a and 76b switch voltage of the UV line 36a between positive voltage and negative voltage of the battery pack 34. The switching elements 76c and 76d switch voltage of the VW line 36b between positive voltage and negative voltage of the battery pack 34. The switching elements 76e and 76f switch voltage of the WU line 36c between positive voltage and negative voltage of the battery pack 34. The gate driver 78 controls switching of the switching elements 76a, 76b, 76c, 76d, 76e, and 76f.

Based on input signals from the trigger switch 26 and the operation button 28a and input signals from the magnetic sensors 46a, 46b, and 46c, the processing unit 80 controls operation of the motor 14 and controls operation of the display lamp 30a of the display panel 30. Specifically, the processing unit 80 detects the rotational position of the rotor 50 of the motor 14 based on input signals from the magnetic sensors 46a, 46b, and 46c, and controls switching timings of the switching elements 76a, 76b, 76c, 76d, 76e, and 76f in accordance with the rotational position of the rotor 50.

The control board and the sensor board 46 are connected to each other by a sensor signal line 38. The sensor signal line 38 includes: a supply voltage line 38a for supplying power supply voltage from the control board to the magnetic sensors 46a, 46b, and 46c; earth voltage lines 38b, 38c, and 38d for supplying earth voltage from the control board to the magnetic sensors 46a, 46b, and 46c; and detection signal lines 38e, 38f, and 38g for supplying detection signals from the magnetic sensors 46a, 46b, and 46c to the processing unit 80.

The motor power line 36 passes through the inside of the support pole 4, to connect the control board in the rear end housing 32 and the motor 14 in the motor housing 16. Similarly, the sensor signal line 38 passes through the inside of the support pole 4, to connect the control board in the rear end housing 32 and the sensor board 46 in the motor housing 16.

In the present embodiment, of the sensor signal line 38 passing through the inside of the support pole 4, the detection signal lines 38e, 38f, and 38g are respectively twisted with the corresponding earth voltage lines 38b, 38c, and 38d. In the present embodiment, a twisting pitch of the detection signal lines 38e, 38f, and 38g and the corresponding earth voltage lines 38b, 38c, and 38d is, for example, 24 mm. Thus, since the detection signal lines 38e, 38f, and 38g are respectively twisted with the corresponding earth voltage lines 38b, 38c, and 38d, noise from the motor power line 36 placed in parallel therewith inside the support pole 4 can be prevented from being superimposed on the detection signal lines 38e, 38f, and 38g.

Figure 11:
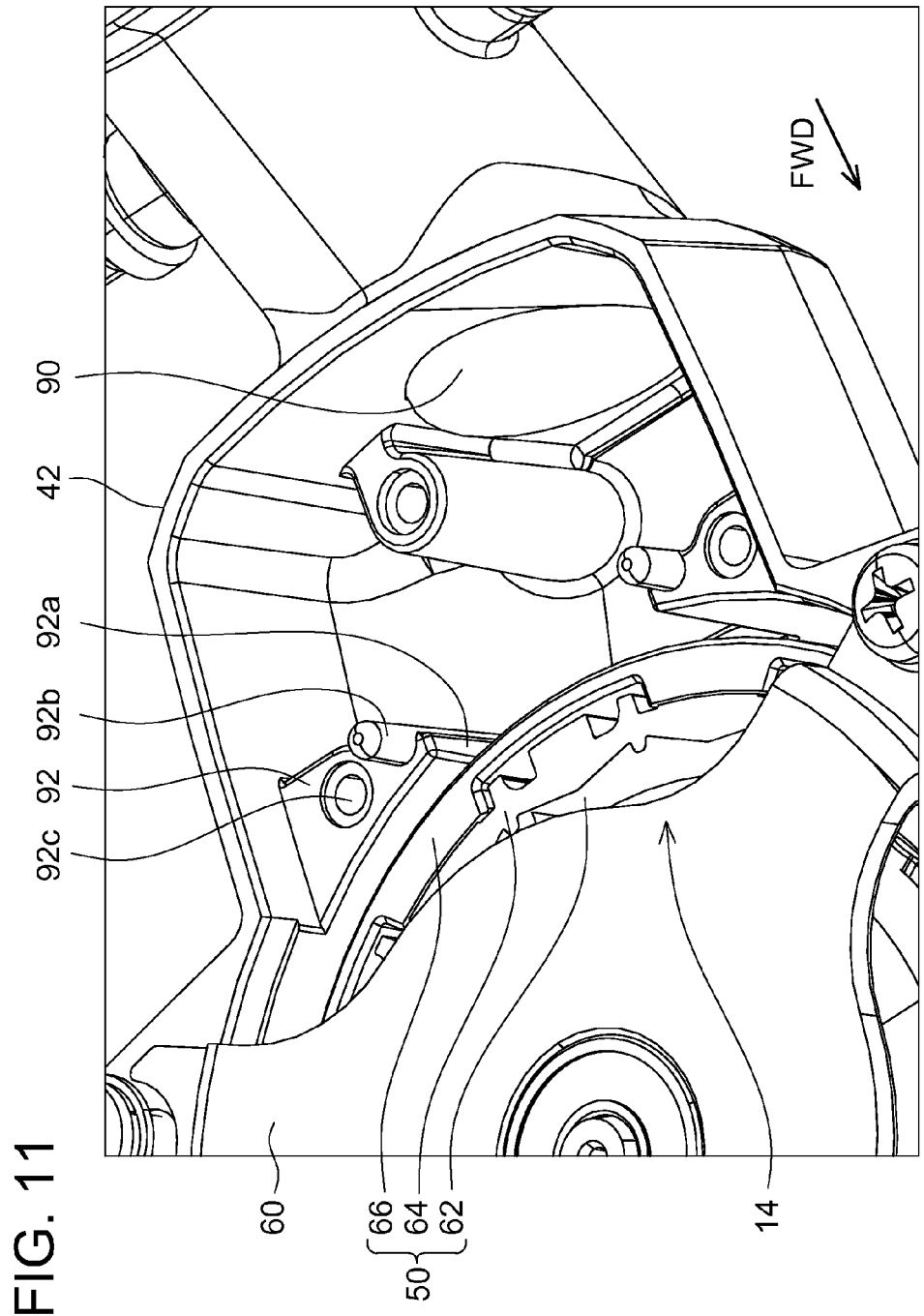
FIG. 11 is a perspective view showing the inside of a housing body 42 of the bush cutter 2 in the embodiment.
Figure 12:
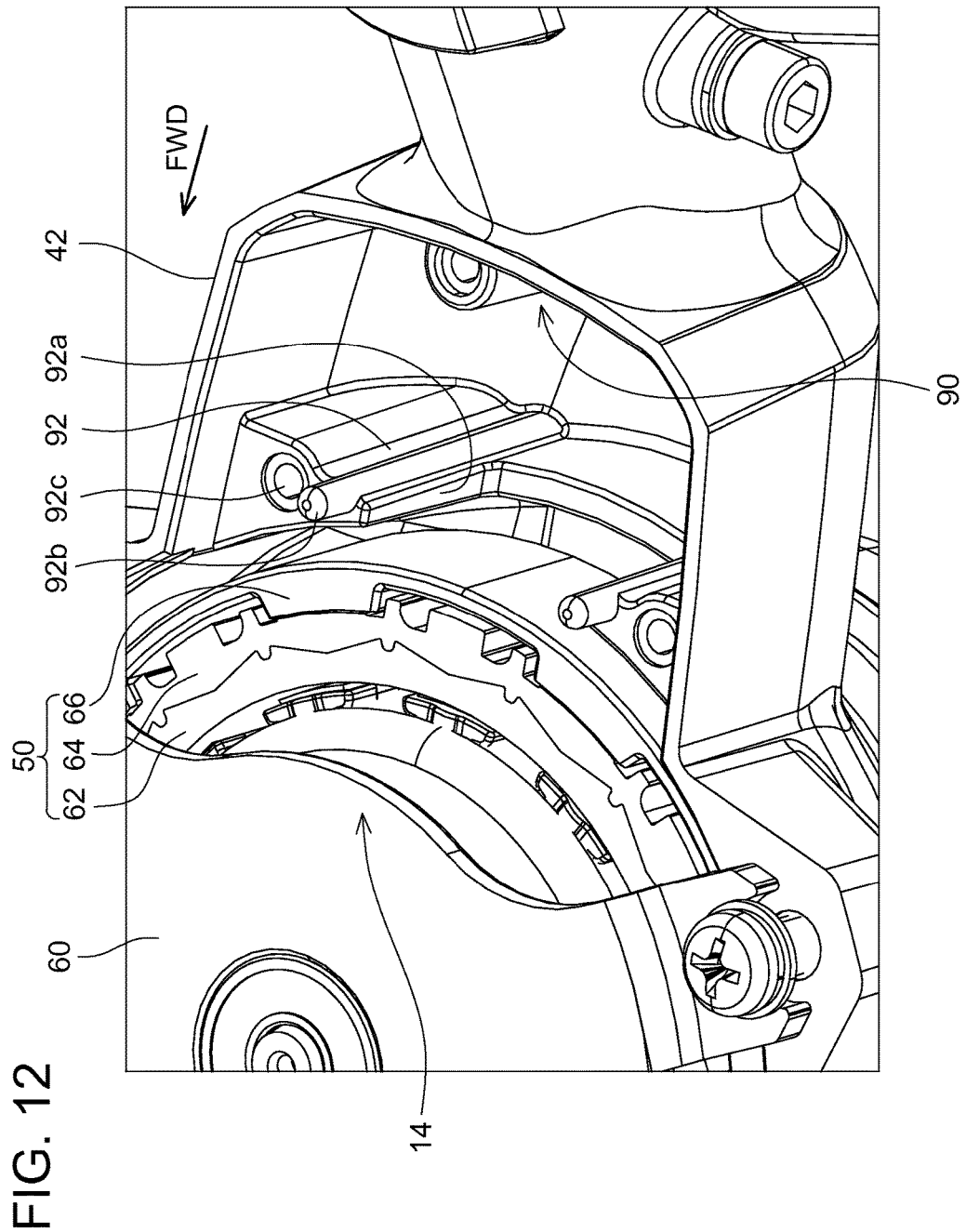
FIG. 12 is another perspective view showing the inside of the housing body 42 of the bush cutter 2 in the embodiment.

As shown in FIG. 11, an opening 90 communicated with the inside of the support pole 4 is formed at a rear wall surface of the housing body 42 of the motor housing 16. The motor power line 36 and the sensor signal line 38 are led from the inside of the housing body 42 into the support pole 4 via the opening 90. As shown in FIG. 11 and FIG. 12, a partition wall 92 surrounding the circumference of the rotor 50 of the motor 14 is formed at the rear of the housing body 42.

In assembling the bush cutter 2, it is necessary to perform work of connecting the motor power line 36 (see FIG. 10) extending from the support pole 4 into the housing body 42 via the opening 90, with the motor power line 36 extending from the motor 14. Further, it is necessary to perform work of connecting, to the sensor board 46 (see FIG. 10), the sensor signal line 38 (see FIG. 10) extending from the support pole 4 into the housing body 42 via the opening 90. In the case where the partition wall 92 is formed between the opening 90 and the motor 14 in the housing body 42, the partition wall 92 obstructs work of connecting the motor power line 36 or the sensor signal line 38 led out from the opening 90, and thus it becomes difficult to perform the work. Considering this, in the bush cutter 2 of the present embodiment, the partition wall 92 between the opening 90 and the motor 14 has a cutout 92a. Such a structure prevents the partition wall 92 from obstructing the work of connecting the motor power line 36 or the sensor signal line 38, and thus can facilitate such work.

Figure 13:
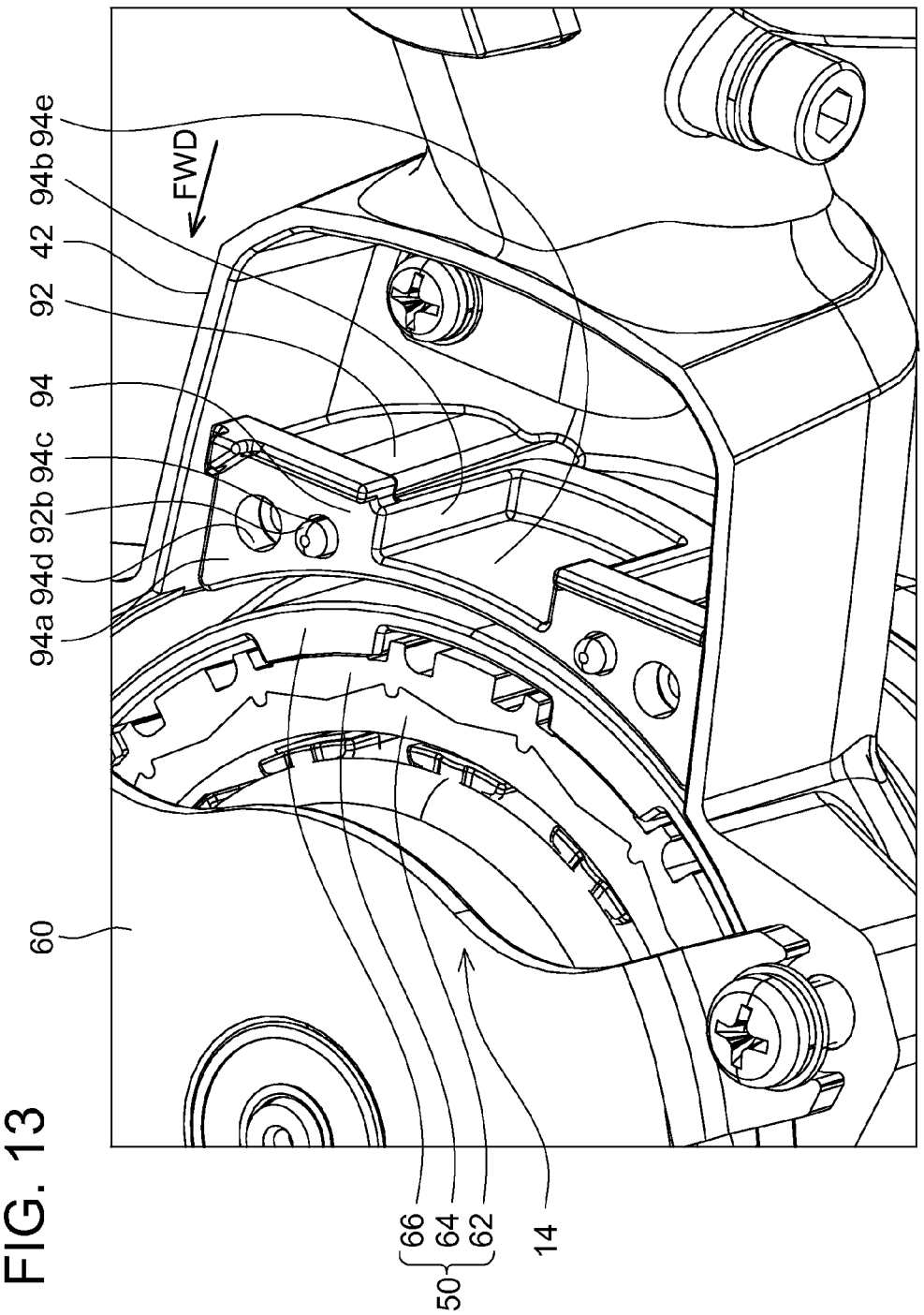
FIG. 13 is another perspective view showing the inside of the housing body 42 of the bush cutter 2 in the embodiment.

As shown in FIG. 13, after the work of connecting the motor power line 36 and connecting the sensor signal line 38 is finished, a detachable inner cover 94 is attached to the cutout 92a of the partition wall 92. In FIG. 13, for the purpose of clear illustration, the motor power line 36 and the sensor signal line 38 are not shown. Since the cutout 92a of the partition wall 92 is closed by the inner cover 94, the motor power line 36 or the sensor signal line 38 led out from the opening 90 is prevented from interfering with the rotor 50. The inner cover 94 is a member made of resin. Therefore, even if the motor power line 36 or the sensor signal line 38 led out from the opening 90 comes into contact with the inner cover 94 during usage of the bush cutter 2, damage on the motor power line 36 or the sensor signal line 38 can be suppressed.

Figure 14:
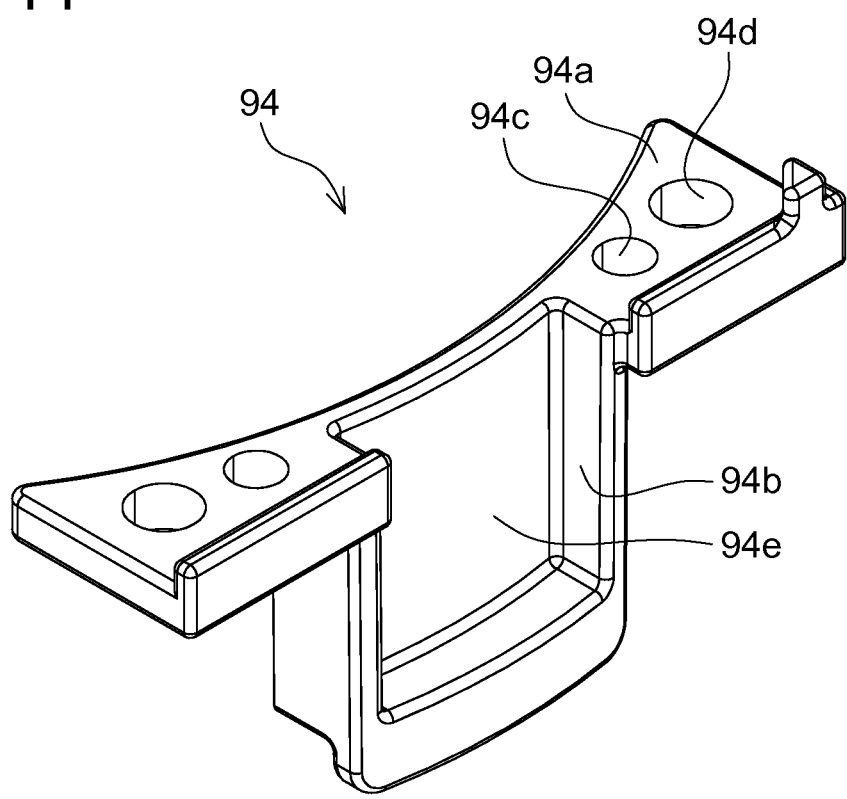
FIG. 14 is a perspective view showing an inner cover 94 of the bush cutter 2 in the embodiment.

As shown in FIG. 14, the inner cover 94 has an attachment portion 94a and a closing portion 94b. A lower surface of the attachment portion 94a is formed in such a shape that the attachment portion 94a can be placed on an upper surface of the partition wall 92 of the housing body 42. An upper surface of the attachment portion 94a is formed in a flat shape, and is used as a seat surface on which the sensor board 46 (see FIG. 15) is placed. The attachment portion 94a has a positioning hole 94c through which a positioning pin 92b (see FIG. 11 and FIG. 12) formed on the upper surface of the partition wall 92 penetrates, and a bolt penetration hole 94d through which a fastening bolt 98 (see FIG. 15) penetrates. The closing portion 94b is formed in such a shape as to close the cutout 92a of the partition wall 92 of the housing body 42. A recess 94e is formed in a surface of the closing portion 94b, opposed to the opening 90. Since the recess 94e is formed in the closing portion 94b, arrangement work of the motor power line 36 and the sensor signal line 38 can be easily performed even after the cutout 92a of the partition wall 92 is closed by the inner cover 94.

Figure 15:
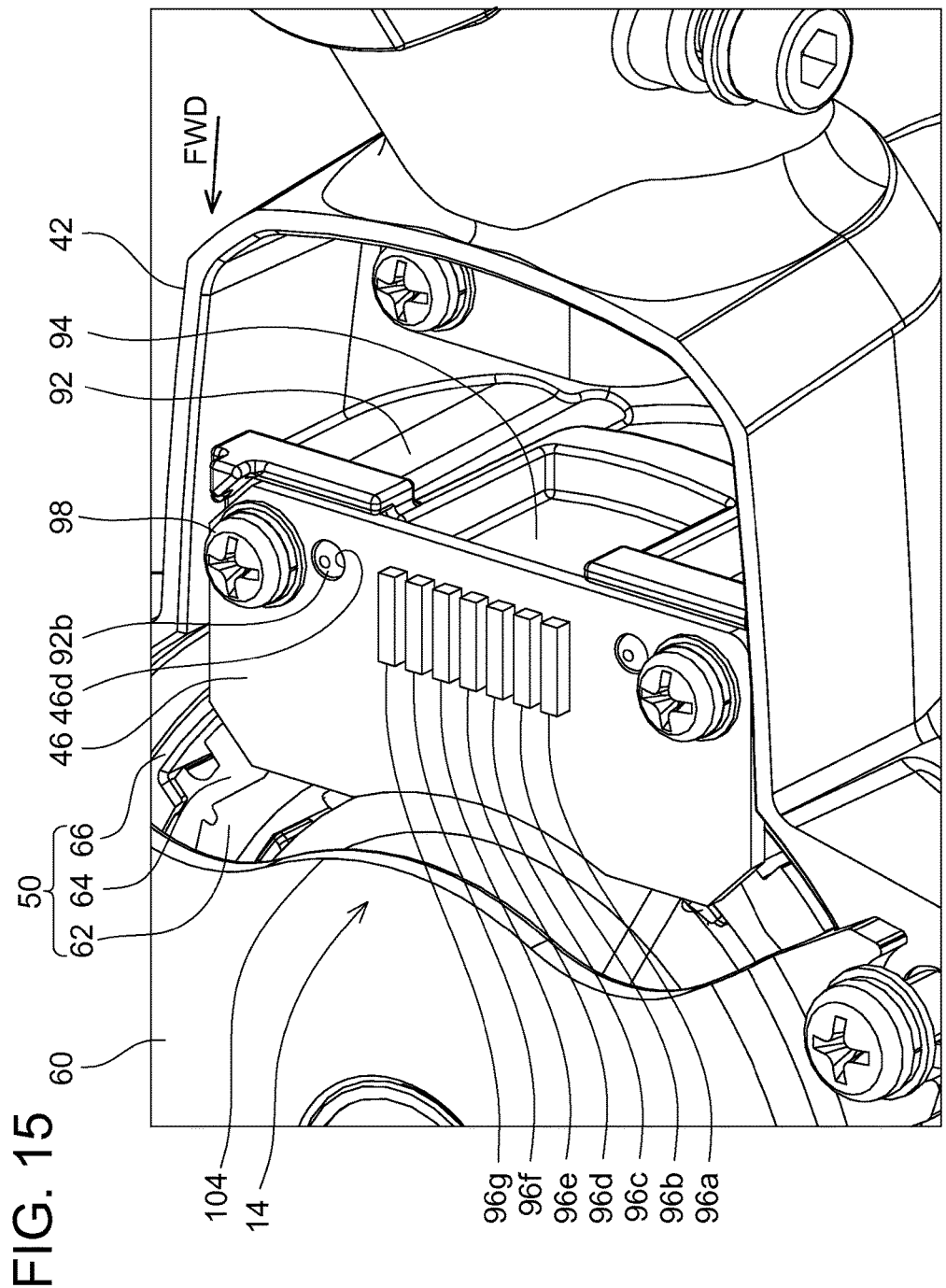
FIG. 15 is another perspective view showing the inside of the housing body 42 of the bush cutter 2 in the embodiment.
Figure 16:
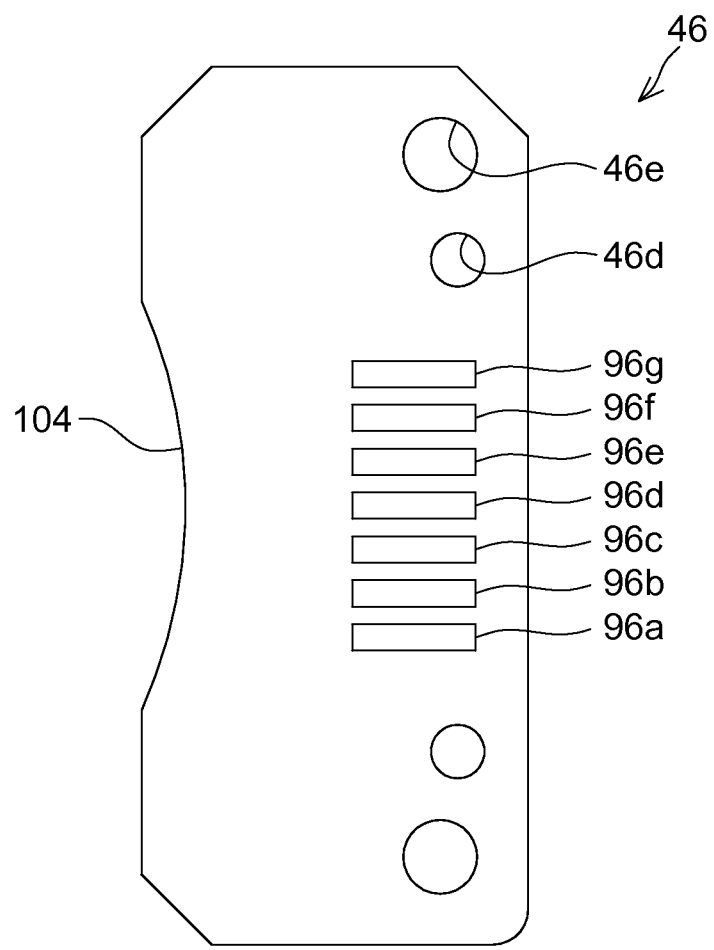
FIG. 16 is a plan view showing an upper surface of a sensor board 46 of the bush cutter 2 in the embodiment.
Figure 17:
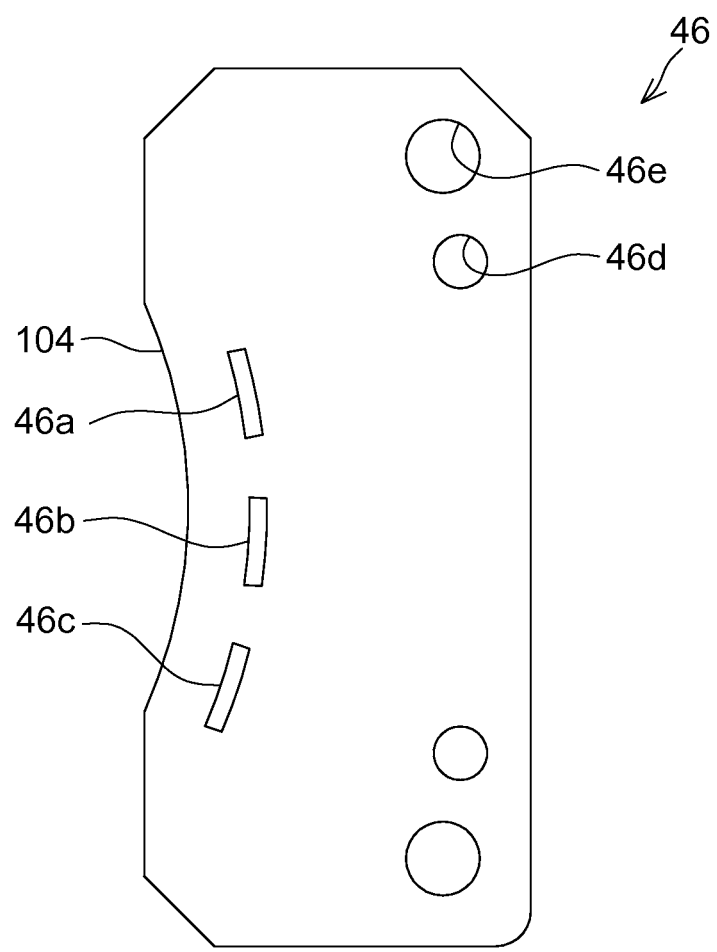
FIG. 17 is a plan view showing a lower surface of the sensor board 46 of the bush cutter 2 in the embodiment.

As shown in FIG. 15, the sensor board 46 is placed on the upper surface of the attachment portion 94a of the inner cover 94. In FIG. 15, for the purpose of clear illustration, the motor power line 36 and the sensor signal line 38 are not shown. As shown in FIG. 16 and FIG. 17, the sensor board 46 has connection terminals 96a, 96b, 96c, 96d, 96e, 96f, and 96g on an upper surface thereof, and magnetic sensors 46a, 46b, and 46c on a lower surface thereof. The connection terminals 96a, 96b, 96c, 96d, 96e, 96f, and 96g are respectively connected to the supply voltage line 38a, the earth voltage lines 38b, 38c, and 38d, and the detection signal lines 38e, 38f, and 38g of the sensor signal line 38. The sensor board 46 has a positioning hole 46d through which the positioning pin 92b penetrates, and a bolt penetration hole 46e through which the fastening bolt 98 penetrates. As shown in FIG. 15, the sensor board 46 is placed on the upper surface of the attachment portion 94a of the inner cover 94, and then the fastening bolt 98 is caused to penetrate through the bolt penetration hole 46e of the sensor board 46 and the bolt penetration hole 94d of the inner cover 94, to be fastened with the bolt hole 92c (see FIG. 11) of the partition wall 92, whereby the sensor board 46 and the inner cover 94 are fixed to the housing body 42.

In the present embodiment, the inner cover 94 which is a member made of resin is interposed between the housing body 42 and the sensor board 46. Owing to such a structure, even if the temperature of the housing body 42 increases, increase in the temperature of the sensor board 46 can be suppressed. In addition, the sensor board 46 and the housing body 42 can be electrically insulated from each other.

Figure 18:
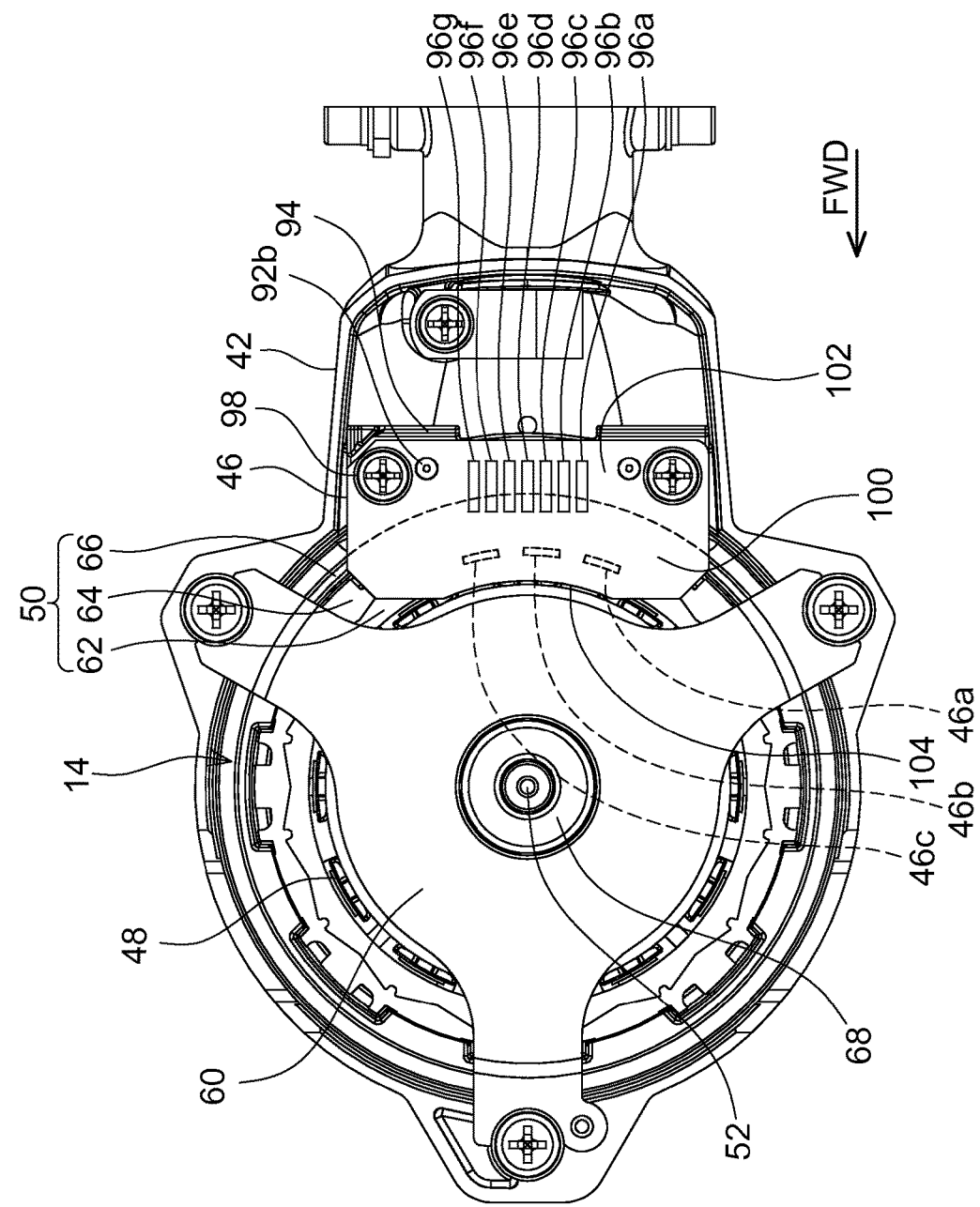
FIG. 18 is a plan view showing a state in Which the sensor board 46 of the bush cutter 2 in the embodiment is attached.

As shown in FIG. 18, the sensor board 46 is formed so as to partially cover the rotor 50 without covering the entire circumference of the rotor 50. In FIG. 18, for the purpose of clear illustration, the motor power line 36 and the sensor signal line 38 are not shown. Preferably, the sensor board 46 is formed so as to cover a range narrower than 180 degrees, of the rotor 50. More preferably, the sensor board 46 is formed so as to cover a range narrower than 150 degrees, of the rotor 50. Further preferably, the sensor board 46 is formed so as to cover a range narrower than 120 degrees, of the rotor 50. In the bush cutter 2 of the present embodiment, the sensor board 46 is formed so as to cover a range of 80 degrees, of the rotor 50. The sensor board 46 is formed in a substantially rectangular shape, and has a portion 100 covering the rotor 50, and a portion 102 not covering the rotor 50. Owing to such a structure, the sensor board 46 can be downsized as compared to the case where the sensor board 46 is formed so as to cover the entire circumference of the rotor 50. In addition, the yield ratio of the sensor board 46 can be improved as compared to the case where the sensor board 46 is formed in such a doughnut shape as to cover the entire circumference of the rotor 50.

The sensor board 46 is placed such that the portion 102 not covering the rotor 50 is broader than the portion 100 covering the rotor 50. Such a structure can suppress increase in the temperature of the sensor board 46 due to heat generated by the motor 14.

The sensor board 46 is fixed to the housing body 42 while the portion 102 not covering the rotor 50 is in contact, with the upper surface of the attachment portion 94a of the inner cover 94, which is a seat surface. Owing to such a structure, the sensor board 46 can be securely fixed. Error in detection of the rotational position of the rotor 50 due to vibration of the sensor board 46 can be suppressed.

The sensor board 46 is fixed to the housing body 42 by the fastening bolt 98 which is a fastening element. Owing to such a structure, the sensor board 46 can be securely fixed to the housing body 42. Error in detection of the rotational position of the rotor 50 due to vibration of the sensor board 46 can be suppressed.

The sensor board 46 has a cutout 104 with a mild arc shape, at a side end of the portion 100 covering the rotor 50. Such a structure can prevent the sensor board 46 from interfering with the coil 58 of the stator 48.

While specific embodiments of the present invention have been described in detail, these embodiments are for illustrative purposes only and are not intended to limit the scope of the claims. The techniques described in the claims include various modifications and changes made to the specific embodiments illustrated above.

In the above embodiment, the bush cutter 2 has the motor 14 of outer rotor type. Instead, the bush cutter 2 may have a motor of inner rotor type.

In the above embodiment, the cord holder 18 is attached under the motor housing 16, and the cord holder 18 is rotated by the motor 14. Instead, a disk blade made of metal may be attached under the motor housing 16, and the disk blade may be rotated by the motor 14.

In the above embodiment, an embodiment of the bush cutter 2 has been described as an example of the electric, working machine. However, the electric working machine may be a weed cutter, a chain saw, a circular cutter (cutoff saw), a sprayer, a spreader, a blower, a dust collector, or the like, or may be an electric tool such as a drill, a driver, or a circular saw.

What is claimed is:

1. An electric working machine comprising:
   a brushless motor including a stator, a rotor and a motor shaft, the stator having a coil, the rotor having a magnet and disposed on an outer circumferential side of the stator, and the motor shaft configured to be rotated by the rotor;
   a sensor board including a magnetic sensor configured to detect magnetic variation due to rotation of the rotor; and
   a housing which contains the brushless motor and the sensor board, wherein
   the sensor board does not cover an entire circumference of the rotor,
   the sensor board has a portion covering the rotor, and a portion not covering the rotor; and
   the sensor board has a cutout for avoiding overlap with the stator.

2. The electric working machine according to claim 1, wherein
   of the sensor board, the portion not covering the rotor is larger in area than the portion covering the rotor.

3. The electric working machine according to claim 1, wherein
   the sensor board is fixed to the housing while the portion not covering the rotor is in contact with a seat surface.

4. The electric working machine according to claim 3, wherein
   the seat surface is formed as a member made of resin, and the sensor board is fixed to the housing via the member made of resin.

5. The electric working machine according to claim 1, wherein
   the sensor board is fixed to the housing by a fastening element.

6. The electric working machine according to claim 1, wherein
   the sensor board covers a range narrower than 180 degrees, of the rotor.

7. An electric working machine comprising:
   a motor including a rotor;
   a sensor board including a magnetic sensor configured to detect magnetic variation due to rotation of the rotor;
   a housing which contains the motor and the sensor board; and
   a support pole connected to a rear side of the housing, wherein
   the sensor board covers a rear part of the rotor and does not cover a front part of the rotor, and
   the sensor board has a portion covering the rotor, and a portion not covering the rotor.

\* \* \* \* \*